(12) United States Patent
Kojima et al.

(10) Patent No.: US 9,116,298 B2
(45) Date of Patent: Aug. 25, 2015

(54) MULTI-MODE INTERFERENCE DEVICE

(71) Applicant: Mitsubishi Electric Research Laboratories, Inc., Cambridge, MA (US)

(72) Inventors: Keisuke Kojima, Weston, MA (US); Selman Ozbayat, Sunderland, MA (US); Toshiaki Koike-Akino, Medford, MA (US); Bingnan Wang, Quincy, MA (US); Satoshi Nishikawa, Tokyo (JP); Eiji Yagyu, Tokyo (JP)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 244 days.

(21) Appl. No.: 13/832,620

(22) Filed: Mar. 15, 2013

(65) Prior Publication Data

US 2014/0270635 A1  Sep. 18, 2014

(51) Int. Cl.
*G02B 6/28* (2006.01)
*G02B 6/293* (2006.01)
*G02B 6/12* (2006.01)
*G02B 6/10* (2006.01)

(52) U.S. Cl.
CPC .......... *G02B 6/2813* (2013.01); *G02B 6/12007* (2013.01); *G02B 6/29344* (2013.01); *G02B 6/105* (2013.01); *G02B 2006/12176* (2013.01)

(58) Field of Classification Search
CPC ..................................................... G02B 6/2813
See application file for complete search history.

(56) References Cited

U.S. PATENT DOCUMENTS

| | | | |
|---|---|---|---|
| 6,549,696 B1 * | 4/2003 | Uetsuka et al. | 385/24 |
| 6,571,038 B1 * | 5/2003 | Joyner et al. | 385/40 |
| 6,788,863 B2 * | 9/2004 | Parker et al. | 385/122 |
| 7,155,088 B2 * | 12/2006 | Thapliya et al. | 385/28 |
| 7,184,207 B1 * | 2/2007 | Walker et al. | 359/344 |
| 7,349,628 B2 | 3/2008 | Augustsson | |
| 2002/0159696 A1 * | 10/2002 | Yamauchi et al. | 385/37 |
| 2003/0026544 A1 * | 2/2003 | Lin | 385/39 |
| 2008/0260322 A1 * | 10/2008 | Thapliya et al. | 385/9 |
| 2013/0136389 A1 * | 5/2013 | Luo et al. | 385/11 |

OTHER PUBLICATIONS

Sakamaki, Yohei, et al. "New Optical Waveguide Design Based on Wavefront Matching Method." Journal of Lightwave Technology, vol. 25, No. 11, 3511-3518. Nov. 2007.

* cited by examiner

*Primary Examiner* — Michelle R Connelly
(74) *Attorney, Agent, or Firm* — Dirk Brinkman; Gene Vinokur (57) ABSTRACT

A multi-mode interference (MMI) device includes a substrate layer, a core layer grown on the substrate layer for propagating an optical signal, and a cladding layer grown on the core layer for guiding the optical signal. The MMI device also includes a non-uniform pattern of patches forming a non-uniform refractive index distribution within the MMI device.

19 Claims, 10 Drawing Sheets

MULTI-MODE INTERFERENCE DEVICE

FIELD OF THE INVENTION

This invention relates generally to optical devices, and more particularly to multi-mode interference (MMI) devices for propagating and manipulating an optical signal.

BACKGROUND OF THE INVENTION

In optical communications, wavelengths and polarizations of optical signals can be multiplexed in an optical carrier. Telecommunication networks are increasingly focusing on flexibility and configurability, which requires enhanced functionality of photonic integrated circuits (PICs) for optical communications, as well as compact devices. Optical devices based on multi-mode interference (MMI) have large bandwidth, are polarization insensitive, and have high fabrication tolerances.

For a number of applications, it is desired to minimize a length of the MMI device manipulating the optical signal. For example, in one MMI device, an indium gallium arsenide phosphide (InGaAsP) core, such as $In_{1-x}Ga_xAs_yP_{1-y}$ (y=0.4), is sandwiched between an indium phosphide (InP) substrate and upper cladding.

The optical signal is concentrated in the core because the core has a high refractive index. The clading, which has a relatively low refractive index, guides the optical signal along a depth of the device. The length L of the MMI device requires a sequential number of repetitions of the beat length for the low and high wavelengths. The beat length is the length required for the polarization to rotate 360 degrees.
For example, $$L = M \times L_\pi^{\lambda_1} = (M+1) \times L_\pi^{\lambda_2}, \quad (1)$$

where $L_\pi^{\lambda_1}$ and $L_\pi^{\lambda_2}$ are the beat lengths at wavelengths $\lambda_1$ and $\lambda_2$, respectively, and M is an integer. For an MMI device of a width W at wavelength $\lambda$, $L_\pi \propto W^2/\lambda$, the required L for a typical 1.27/1.29 μm wavelength splitter with W=8 μm longer than 5 mm.

However, the wavelength separation for 40/100G Ethernet is typically 20 nm or smaller. It is a challenging to combine and separate optical signals oscillating with similar wavelengths in a small device.

For example, one MMI-based wavelength splitter/combiner is described in Yao et al., Optics Express 20 p. 16, (2012). However, for operation of that device, wavelength separation has to be very large (such as 1.3 um and 1.55 um). Another optical manipulator is described by Jiao et al., IEEE J. Quantum Electronics, Vol. 42, No. 3, p. 266 (2006). However, a method used by that manipulator only applies to photonic crystal, and such manipulators are difficult to manufacture. Another method, described in U.S. Pat. No. 7,349,628, multiplexes or demultiplexes optical signals using an external control signal, which is not appropriate for some application.

There is a need to manipulate optical signals with multiple wavelengths or polarizations while reducing the length and complexity of fabrication of an optical device.

SUMMARY OF THE INVENTION

Various embodiment of an invention are based on a realization that optical signals of different wavelength or polarization are affected differently by a change, e.g., a step, ala refractive index, in an optical manipulator. The response of the signals to a single change of the refractive index is typically insufficient to provide a desired manipulation of the signals, such as combining or splitting the signals of different wavelength. However, multiple refractive index steps can collectively achieve the desired effect.

Accordingly, some embodiments of the invention, manipulate the optical signals using an optical device, such as a device using multi-mode interference (MMI), with a non-uniform refractive index distribution within the MMI device. Usually, the non-uniform refractive index distribution is selected for a specific task, such as combining or splitting the signals having predetermined wavelength. Some embodiments use an optimization technique to determine the non-uniform refractive index distribution for the specific task.

The MMI devises according to various embodiments of the invention include patches arranged in a non-uniform, i.e. irregular, pattern in the MMI device. In contrast with a uniform pattern, the patches in a non-uniform pattern are not evenly spaced. Each patch forms a step of refraction index, such that the non-uniform pattern of patches causes the non-uniform refractive index distribution within the MMI device. In one embodiment, the patches have different dimensions, but identical shape, e.g., a rectangular shape, and thickness. Additionally, the patches can be arranged at an identical depth in the MMI device, and formed by a material with the same refractive index. In the alternative embodiments, the patches are varying in shape, sizes, material and the depth.

Some embodiments use optimization method to determine the non-uniform pattern of patches resulting in desired wavelength selectivity in a device with a reduced length. However, optimization parameters can be difficult to select, because the underlying theory of wavelength manipulation using the non-uniform refractive index distribution is still evolving.

Some embodiments determine a set of parameters of the patches randomizing the distribution of the refractive index and optimize the parameters according to a predetermined task. For example, one embodiment uses a covariance matrix adaptation evolutionary strategy (CMA-ES) for the optimization.

Accordingly, one embodiment discloses a multi-mode interference (MMI) device. The MMI device includes a substrate layer; a core layer grown on the substrate layer for propagating an optical signal; and a cladding layer grown on the core layer for guiding the optical signal. The MMI device includes a non-uniform pattern of patches forming a non-uniform refractive index distribution within the MMI device.

Another embodiment discloses a method for manipulating an optical signal according to a predetermined task by a multi-mode interference (MMI) device. The method includes determining a non-uniform pattern of patches forming a non-uniform refractive index distribution within the MMI device, such that the non-uniform pattern of patches manipulates the optical signal according to the predetermined task; and fabricating the MMI device having the non-uniform pattern of patches.

DETAILED DESCRIPTION OF THE PREFERRED EMBODIMENT

Figure 1:
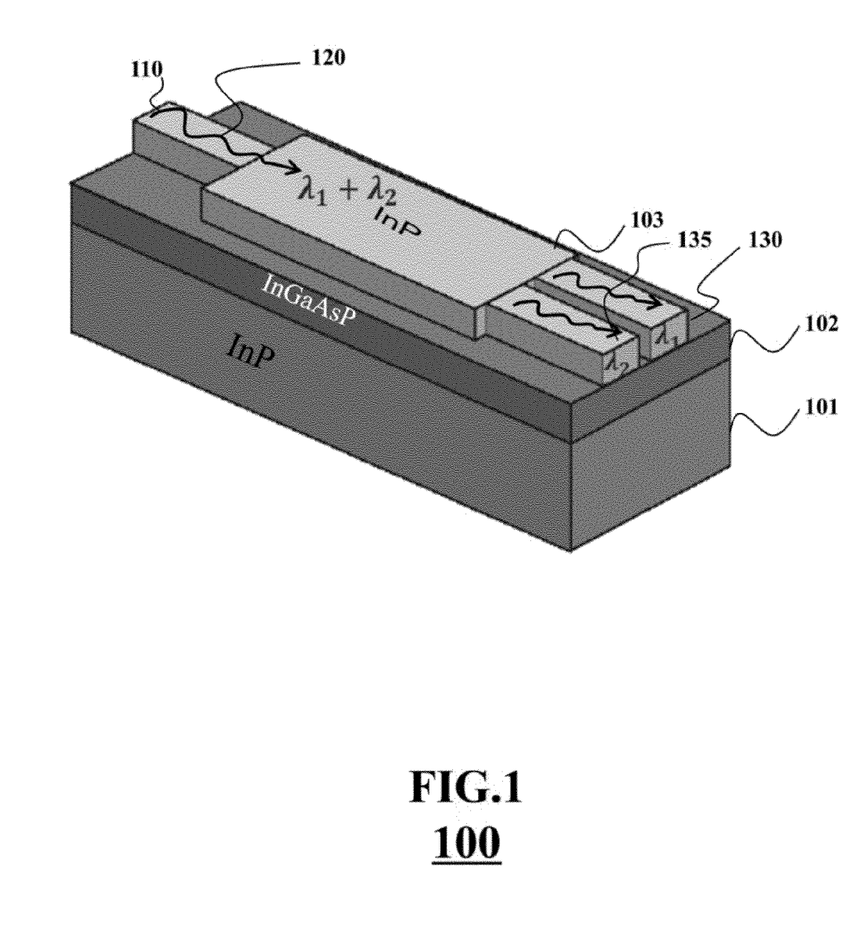
FIG. 1 is an isometric view of an exemplar multi-mode interference (MMI) device in accordance with one embodiment of the invention.

FIG. 1 shows an isometric view of an exemplar multi-mode interference (MMI) device 100 manipulating the optical signal according to a predetermined task in accordance with one embodiment of the invention.

The MMI device can be implemented as an epitaxial-grown structure having a substrate, a core and a cladding layers, as shown below. For example, in one embodiment, the MMI device is an indium phosphide (InP)/indium gallium arsenide phosphide (InGaAsP) structure, which includes an InP substrate, an InGaAsP core layer with As composition of, e.g., 60% lattice matched to InP, and InP cladding layer. In another embodiment, the MMI device can include a gallium arsenide (GaAs)/aluminum gallium arsenide (AlGaAs). Other variations are possible and within the scope of the embodiments of the invention.

For example, the MMI device 100 includes a substrate layer, e.g., an InP layer 101, a core layer, e.g., an InGaAsP layer 102, grown on the substrate layer for propagating an optical signal, and a cladding layer, e.g., an in P layer 103, grown on the core layer for guiding the optical signal.

The MMI device 100 includes an input waveguide 110 for imputing an optical signal 120 and output waveguides 130 and 135 for outputting two signals. In one embodiment, the optical signal includes two signals of different wavelengths including. For example, the optical signal includes a first signal with a first wavelength $\lambda_1$ and a second signal with a second wavelength $\lambda_2$. In this embodiment, the predetermined task includes splitting the optical signal into the first signal and the second signal.

The predetermined task varies among embodiments. For example, in one embodiment, the predetermined task includes combining multiple signals into one signal. In another embodiment, the predetermined task includes combining or splitting multiple signals based on polarization of the signals. Also, in various embodiments, the wavelength, and/or polarization of the signals can vary.

Various embodiment of an invention arc based on a realization that signals of different wavelength or polarization are affected differently by a change, e.g., a step, of a refractive index in an optical manipulator. The response of the signals to a single change of the refractive index is typically insufficient to provide a desired manipulation of the signals, such as combining or splitting the signals of different wavelength. However, a number of refractive index steps can collectively achieve the desired effect. Accordingly, in various embodiments, the MMI device includes a non-uniform pattern of patches forming a non-uniform refractive index distribution within the MMI device.

Figure 2:
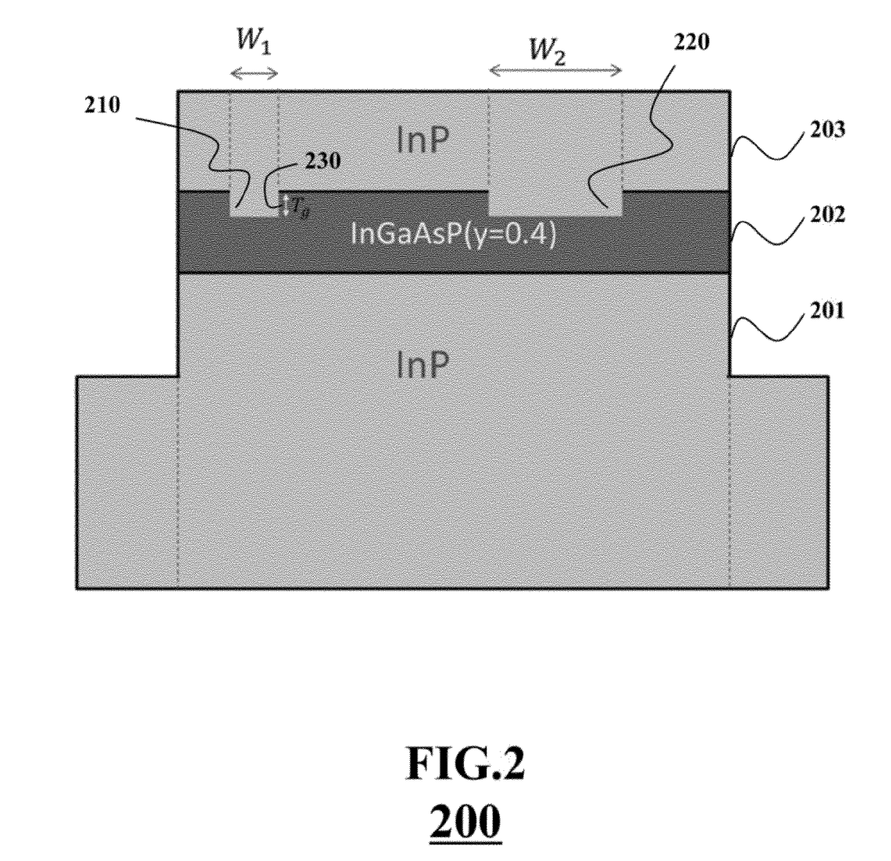
FIG. 2 is a cross section of the MMI device including non-uniform pattern of patches according to One embodiment of the invention.

FIG. 2 shows a cross section of the MMI device 200 including the non-uniform pattern of patches. In the example, the core layer 202 is $In_{1-x}Ga_xAs_yP_{1-y}(y=0.4)$, sandwiched between the InP substrate 201 and the InP cladding layer 203.

The optical signal is concentrated in the core layer having the refractive index higher than refractive index of the cladding layer. The thickness of the substrate is $T_{sub}$ and a thickness of the core layer is $T_{core}$. The lower refractive index of the cladding layers serves as a support for the propagating optical signal along the depth of the MMI device.

In this embodiment, $In_{1-x}Ga_xAs_yP_{1-y}$ is a quaternary material, where x (from 0 to 1) is a fraction of Ga, and y(from 0 to 1) is a fraction of As. For example, if x=0 and y=0, the quaternary material is InP. Similarly, if x=1 and y=1, then the quaternary material is GaAs.

To grow InGaAsP material on top of InP, lattice matched condition defines relationship between between x and y, such as x=−0.42*y. By specifying value of one component, e.g., y=4, the full composition of the material can be determined.

The MMI device 200 includes a patch 210 and a patch 220. The patches 210 and 220 arranged in a non-uniform pattern and form a non-uniform refractive index distribution within the MMI device. In this example, each patch has a rectangular shape and extends through the cladding layer into the core layer by a constant thickness Tg 230. Dimensions of the two patches, e.g., widths of the patches W1 and W2 are different. In alternative embodiments, the patches are varying in shape, sizes, material and the depth.

Figure 3:
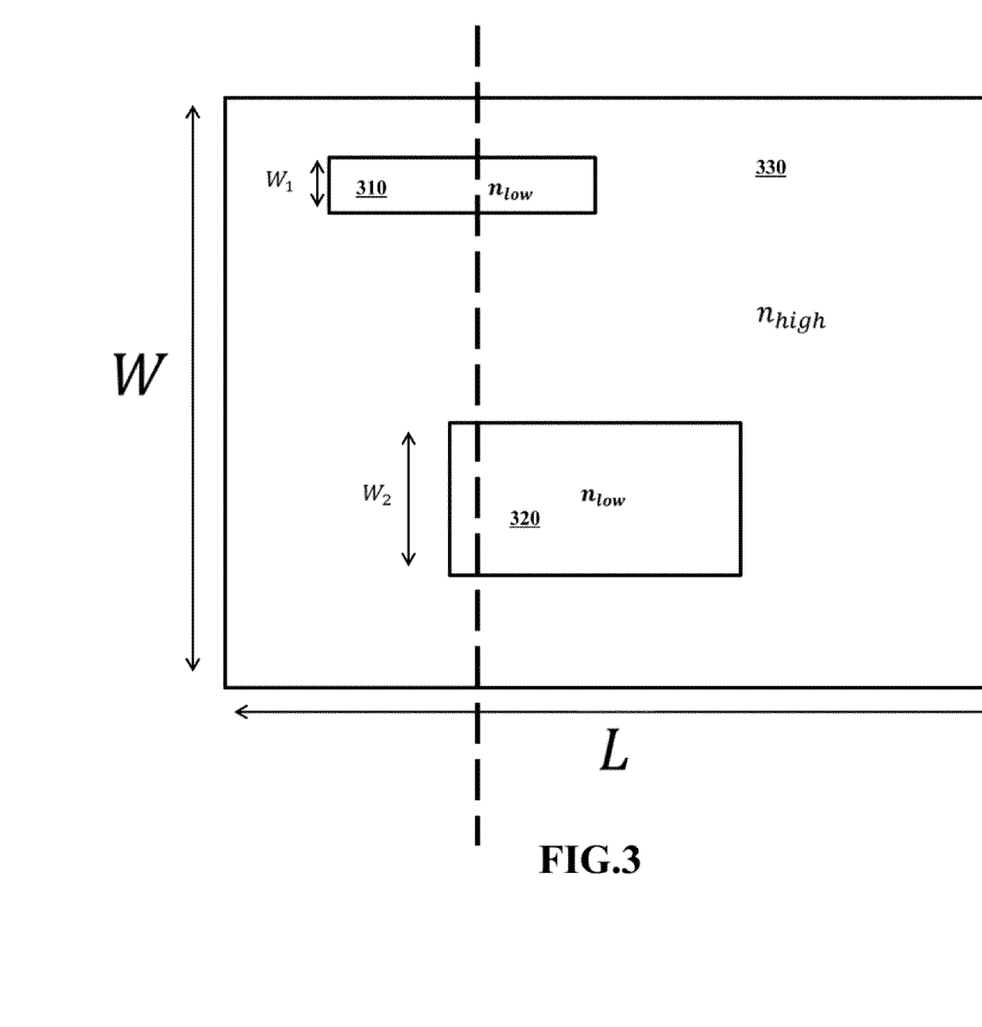
FIG. 3 is a top view of the non-uniform refractive index distribution of the device of FIG. 2.

FIG. 3 shows a top view of the non-uniform refractive index distribution of the device 200. In this embodiment, a refractive index for a region of a patch, e.g., an index $n_{low}$ of a region 310 and 320, is lower than a refractive index for a non-patch region, e.g., an index $n_{high}$ of a region 330. In an alternative embodiment this relationship can be reversed. Also, in one embodiment, the materials of the patches include a metalic material, which causes an imaginary part of the refractive index to produce a predetermined functionality of polarization.

Some embodiments use optimization method to determine the non-uniform pattern of patches resulting in desired wavelength selectivity in a short device. However, optimization parameters can be difficult to select, because the underlying theory of wavelength manipulation using the non-uniform refractive index distribution is still developing. Accordingly, some embodiments determine a set of parameters of the patches randomizing the distribution of the refractive index and optimize the parameters according to a predetermined task.

For example, one embodiment uses covariance matrix adaptation evolutionary strategy (CMA-ES) for the optimization. The CMA-ES optimization requires only a single input a-priori, thus is advantageous for self-adaptation.

Optimization of Non-Uniform Pattern

Figure 4A:
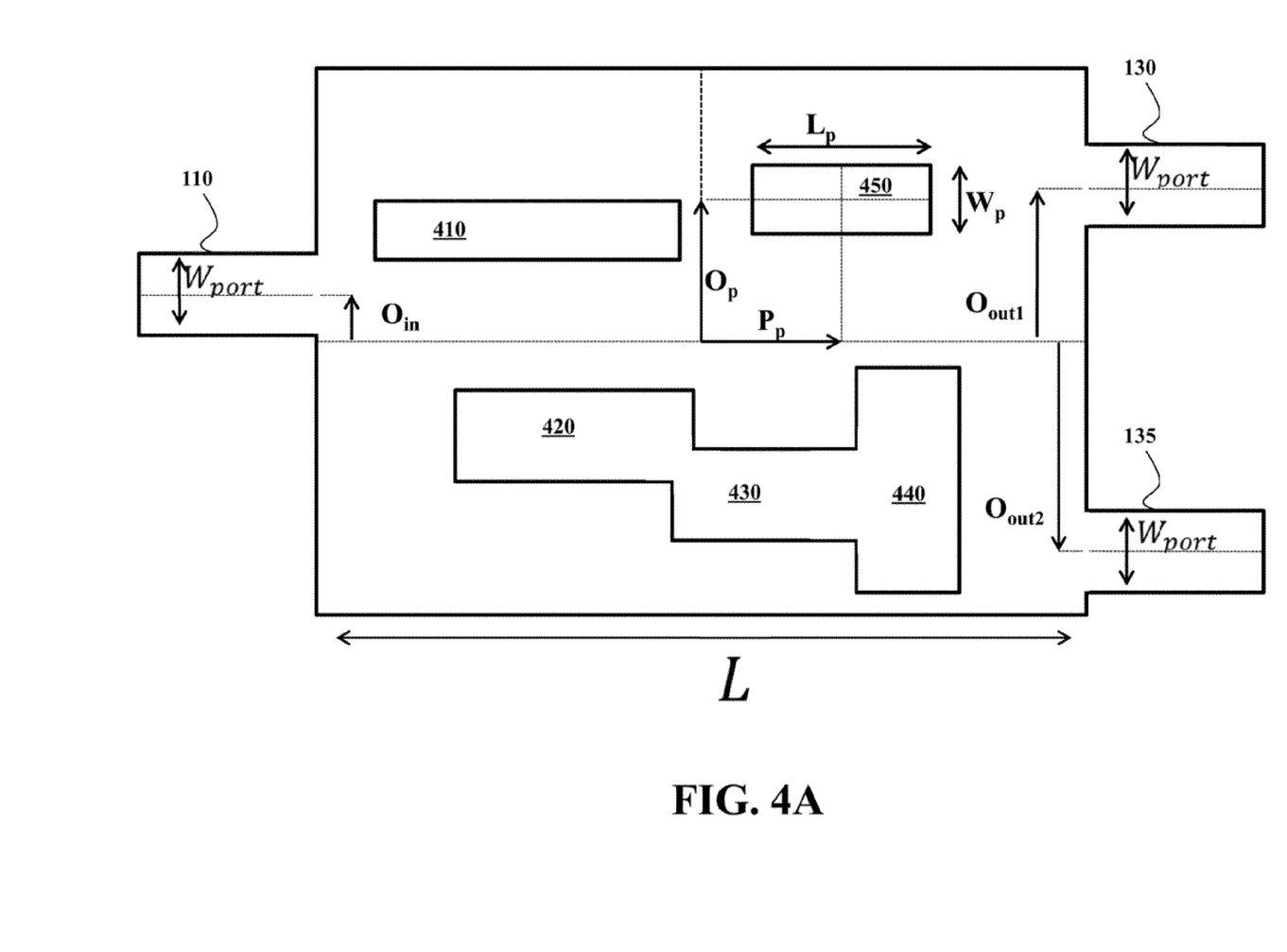
FIG. 4A and FIG. 4B are top views of the device of FIG. 1 according to various embodiments of the invention.

FIG. 4A shows a top view of the device 100 of FIG. 1 having non-uniform refractive index distribution determined using optimization method according to one embodiment of the invention. According to the optimization method, the lateral width W of the MMI device is fixed, and a length L of the device length is kept variable during the optimization. The refractive index distribution is randomized by employing a fixed number of rectangular patches. In this example, the method uses five patches. Each patch identified by four parameters, i.e., a lateral width $W_p$ of the patch, an offset $O_p$ of the patch, a position $P_p$ of the patch and a length $L_p$ of the patch. The position of input waveguide 110 and output waveguides 130 and 135 are identified by lateral axis offsets $O_{in}$, $O_{out1}$ and $O_{out2}$. The width $W_{port}$ of all three waveguides are identical.

FIG. 4 shows the five patches forming the non-uniform pattern. The set of parameters for a patch is assigned with low and high constraints in such a way that the patches can overlap, and reside at least partially inside the MMI device in this example, the total number of variables in the above optimization problem is $N_{var}=4 \times N_p+5$, where $N_p$ is the number of initial patches.

In contrast with a uniform pattern, the patches in a non-uniform pattern are not evenly spaced. For example, the patches 410, 420, 430, 440, and 450 have a different, e.g., random order, orientation, and the distance between each other. For example, the patches 420 and 430 intersect each other, the patches 430 and 440 are bordering each other, and the patches 410 and 450 are located at a distance from each other. Such non-uniformity is formed, at least in par, by an optimization method employed by some embodiments of the invention.

Figure 4B:
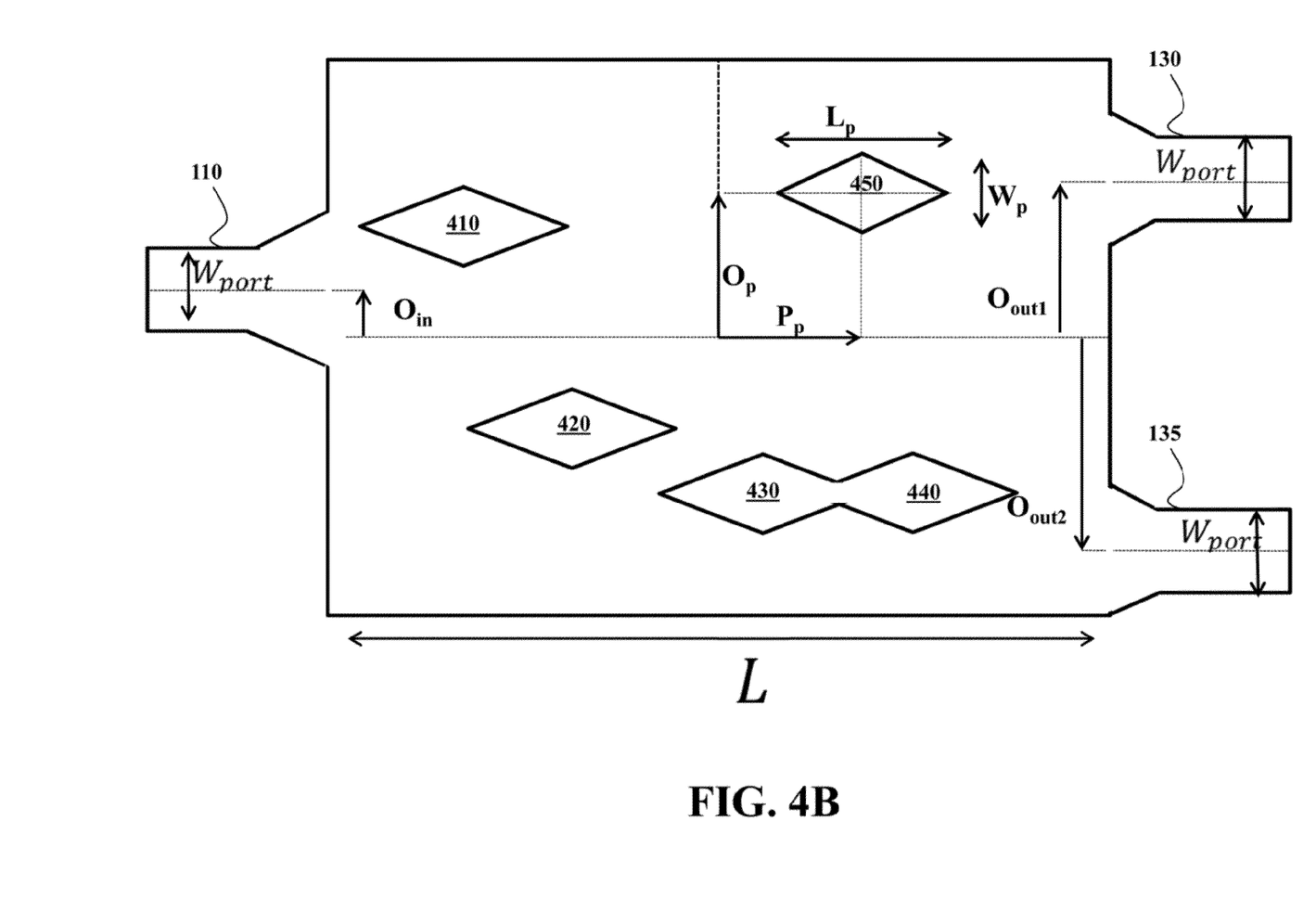

FIG. 4B shows a top view of the device 100 of FIG. 1 according to another embodiment of the invention. This embodiment is based on a realization that reflection from within the device back to the input port causes instability and enhanced noise from the laser device and needs to be minimized. In this embodiment, patches and walls of MMI input/output ports are slanted such that reflection back to the input port is minimized.

Figure 5:
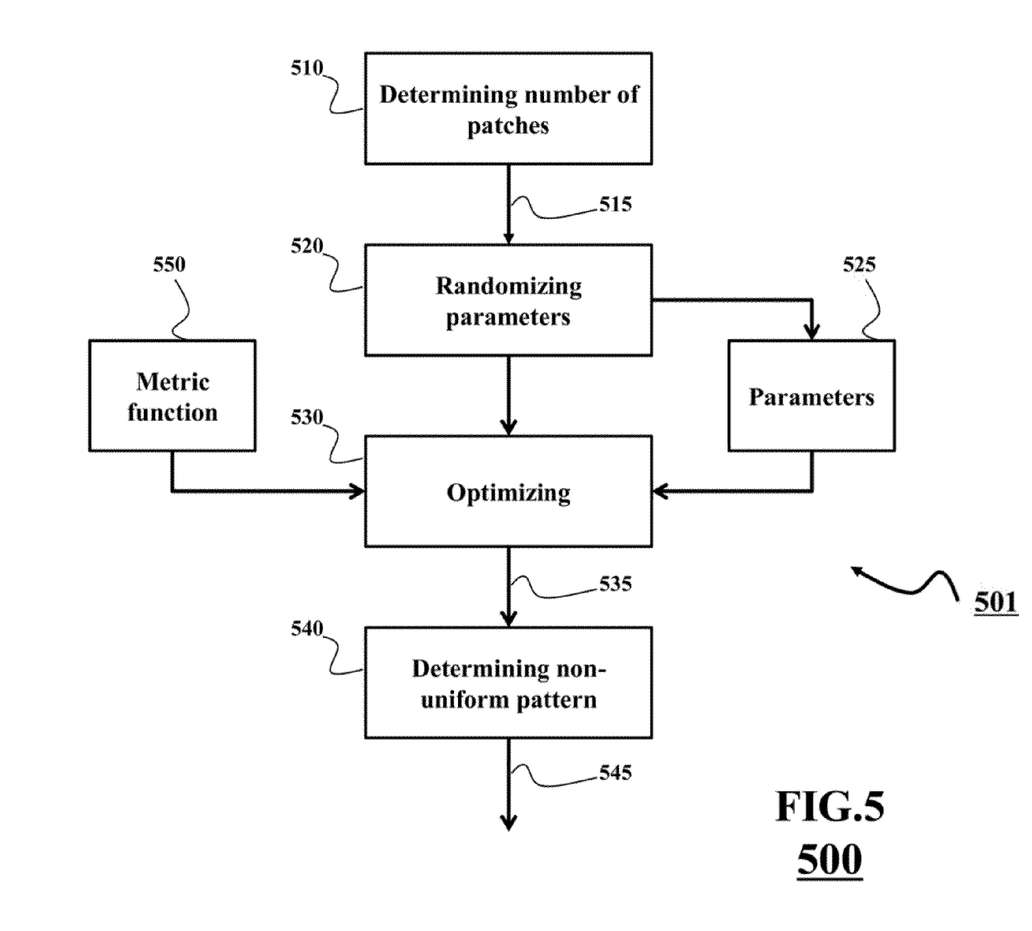
FIG. 5 is a block diagram of a method for determining a non-uniform pattern of patches according to one embodiment of the invention.

FIG. 5 shows a block diagram of a method 500 of one embodiment for determining a non-uniform pattern of patches forming a non-uniform refractive index distribution within the MMI device, such that the non-uniform pattern of patches manipulates the optical signal according to the predetermined task. The method can be implemented using a processor 501.

The method determines a random set 525 of parameters of the non-uniform pattern of patches. For example, the method determines 510 a number 515 of patches and determines 520 randomly values of parameters for each patch. Next, a metric function 550 of the parameters defining an operation of the MMI device performing the predetermined task is optimized 530 to produce an optimal set of parameters 535. The non-uniform pattern 545 of patches is determined 540 using the optimal set of parameters 535.

For example, the embodiment employing the CMA-ES method, searches for the global optimum in the function space is based on several particles. The history of function evaluation distributed on evolving hyper ellipse determines the direction of the method in the next iteration. The number of particles $N_{part}$ is dependent on the problem. In one embodiment the number of particles is $$N_{part}=4+\lfloor 3 \times \ln N_{var} \rfloor. \quad (3)$$

Another aspect of the optimization process is a metric function, i.e. the value returned by each particle at each iteration that is used to evaluate the optimizer behavior at a given iteration. The wavelength combiner/splitter is designed for a predetermined task, e.g., to couple the beam at wavelength $\lambda_1$ and $\lambda_2$ to respective output ports, while suppressing crosstalk. Therefore the metric function is selected accordingly, e.g., to define an operation of the MMI device performing the predetermined task. Among several metric functions used by various embodiments, one metric function maximizes the average convergence of CMA-ES. This metric function is $$\text{Metric}=\log [P_1^{\lambda_1}]+\log [P_2^{\lambda_2}]-\log [P_1^{\lambda_2}+1]-\log [P_2^{\lambda_1}+1], \quad (4)$$

where $P_m^{\lambda_n}$ is the $m^{th}$ mode power at $m^{th}$ output waveguide, at wavelength $\lambda_n$, n=1,2, m=1,2. Some embodiments use fractional power normalized with respect to the power of the fundamental transverse electroMagnetic (TE) mode that exist in the input waveguide and couple to the MMI device, according to $$P_m^{\lambda_n} = \frac{\int_{-W/2}^{W/2} u_{out,m}^{\lambda_n}(x) \cdot (u_{in}^{\lambda_n}(x))^* dx}{\int_{-W/2}^{W/2} |u_{out,m}^{\lambda_n}(x)|^2 dx}, \quad (5)$$

n=1,2, m=1,2. $u_{in}^{\lambda_n}$, $u_{out,1}^{\lambda_n}$ and $u_{out,2}^{\lambda_n}$ are the fundamental TE modes that exist in the input waveguide, first output waveguide and second output waveguide, respectively and at wavelength $\lambda_n$. The maximum possible value of the metric function in (4) is 0, and occurs in the ideal case of no crosstalk at both wavelengths.

Fabrication of Non-Uniform Pattern

After the non-uniform pattern of patches forming a non-uniform refractive index distribution within the MMI device is determined, the MMI device having the non-uniform pattern of patches is fabricated.

Figure 6:
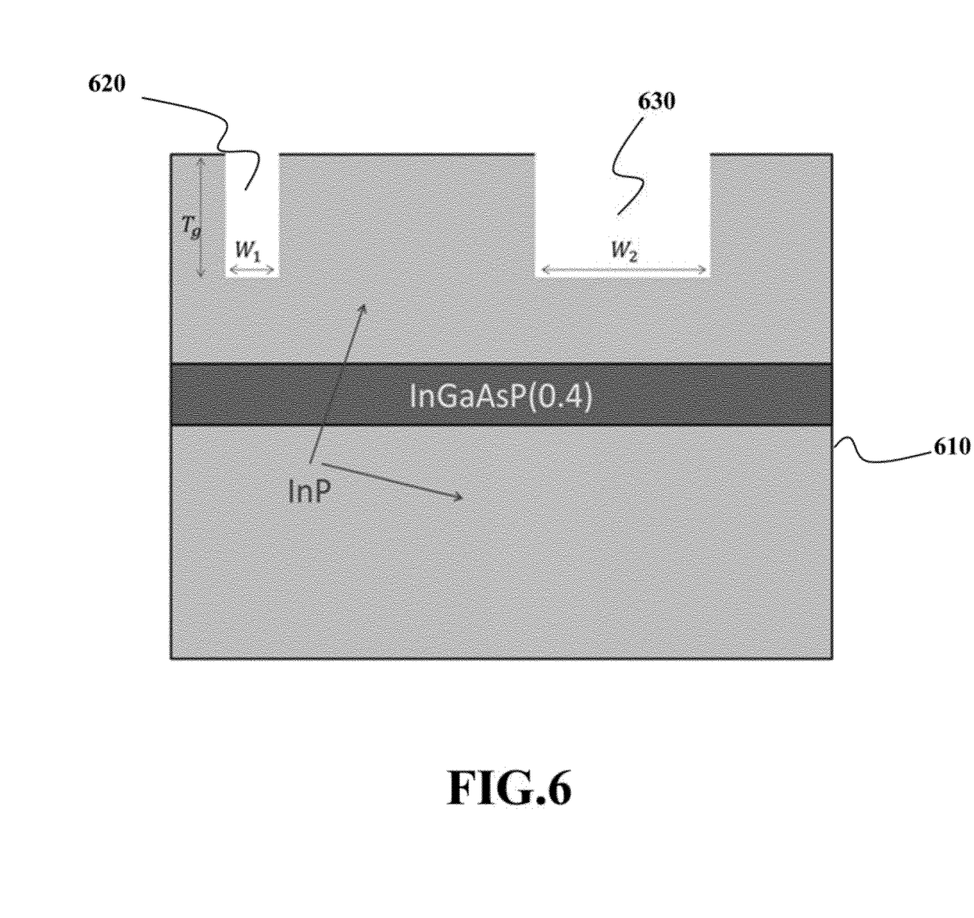
FIG. 6 is a cross section of MMI device fabricated according to one embodiment of the invention.

FIG. 6 shows the MMI device 610 fabricated according to one embodiment of the invention. The embodiment etches into the upper cladding layer or into the core layer with air or a dielectric material, e.g., silicon dioxide such as SiNx and SiO2, forming patches 620 and 630. This embodiment is easier to implement, but the precise formation of the pattern is difficult to control. Specifically, this embodiment requires controlling the stop of the etching, which can create manufacturing issue.

Figure 7:
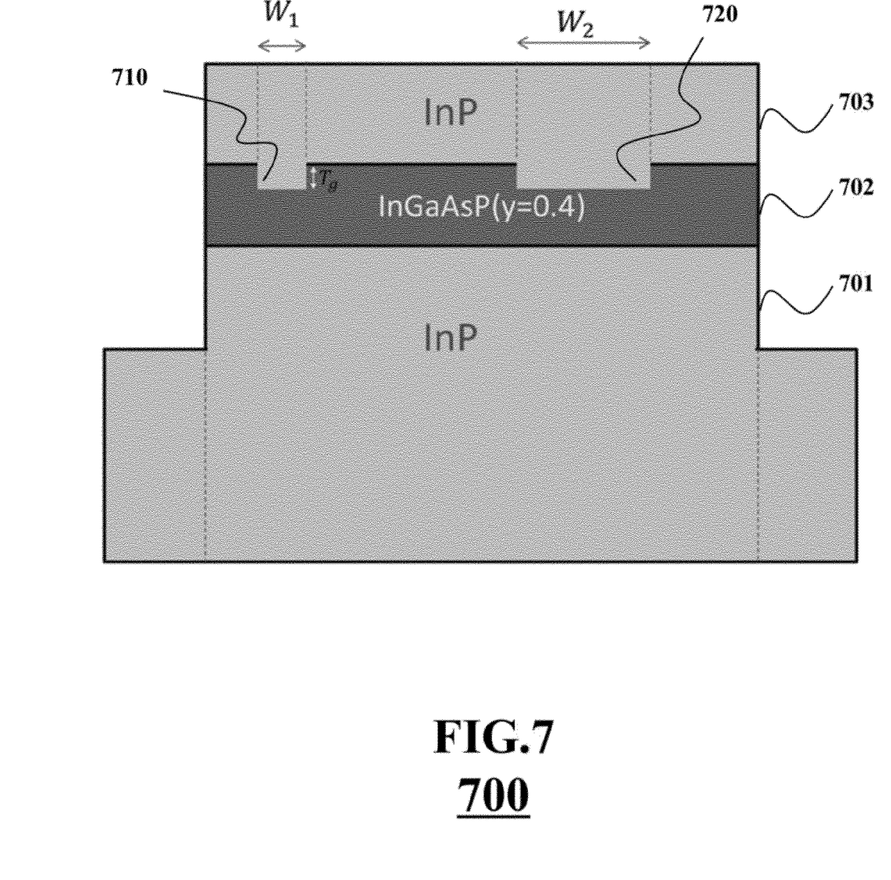
FIG. 7 is a cross section of MMI device fabricated according to another embodiment of the invention.

FIG. 7 shows the MMI device 700 fabricated according to another embodiment. The fabrication includes depositing, e.g., growing, a core layer of the MMI device 702 on a substrate 701, etching the core layer according to the non-uniform pattern of patches to form a non-uniform pattern of etches 710 and 720, and depositing a cladding layer 703 filling the non-uniform pattern of etches. The fabricating process of this embodiment is easier to control.

The effective refractive index of the waveguide depends on the etching depth. The etching is a process of removing unwanted materials. Examples of the etching include wet etching and dry etching. Wet etching, also known as chemical milling, is the process of using acids, bases or other chemicals to dissolve unwanted materials such as metals, semiconductor materials or glass. Dry etching refers to the removal of material by exposing the material to a bombardment of ions that dislodge portions of the material from the exposed surface. For any type of the etching process, control of the etching depth can be difficult, and variation of the etching depth can contribute to performance variations among manufactured devices.

Figure 8:
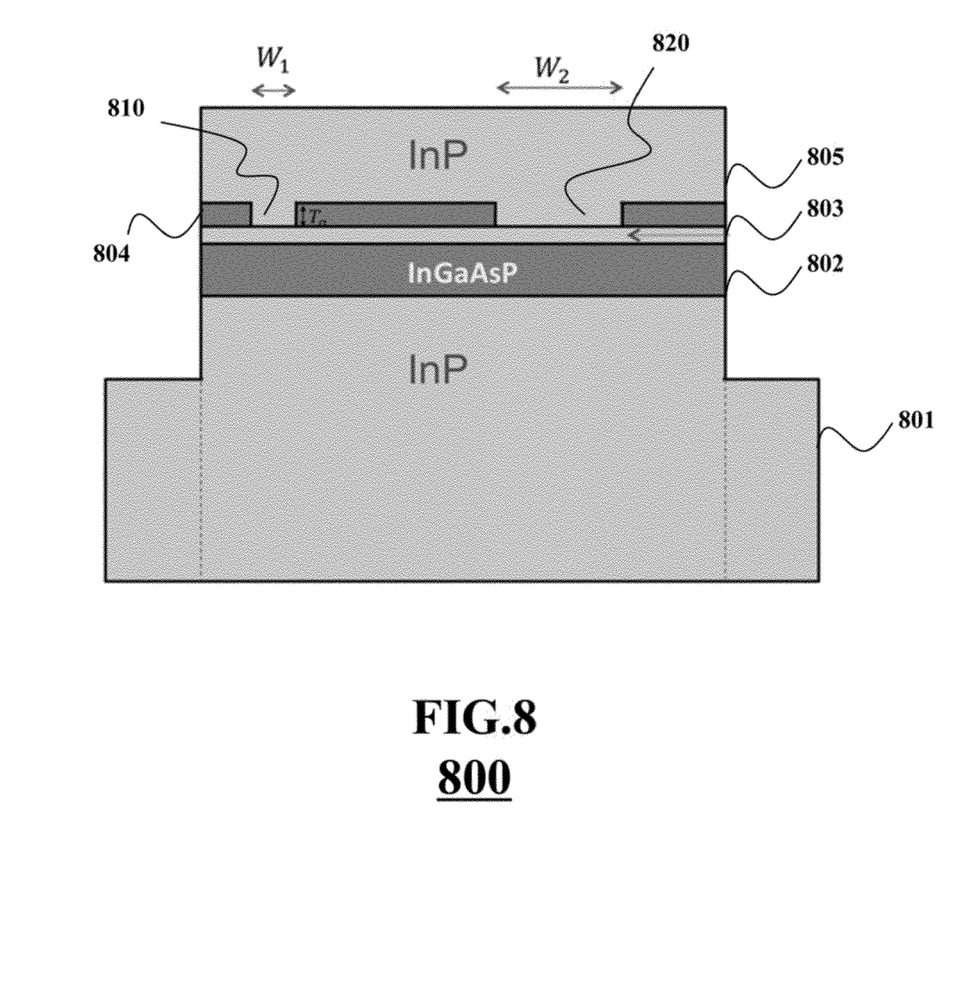
FIG. 8 is a cross section of MMI device fabricated according to yet another embodiment of the invention.

FIG. 8 shows the MMI device 800 fabricated according to yet another embodiment. The fabrication includes growing a first core layer 802 of the MMI device 800 on a substrate 801, growing a first cladding layer 803 of the MMI device on the first core layer, and growing a second core layer 804 of the MMI device grown on the first cladding layer. Etching the second core layer according to the non-uniform pattern of patches to form a non-uniform pattern of etches 810 and 820. Growing a second cladding layer 805 filling the non-uniform pattern of etches. In this embodiment, the etching is controlled such that the second core layer is completely etched and the first cladding layer is only partially etched. The second cladding layer 805 is of the same material as the first cladding layer 803 and the two cladding layers merge to compensate the differences in etching. That way, variability of the etching rate does not affect the device performance, and the fabrication according to this embodiment minimizes the variation of the etching depth.

Figure 9:
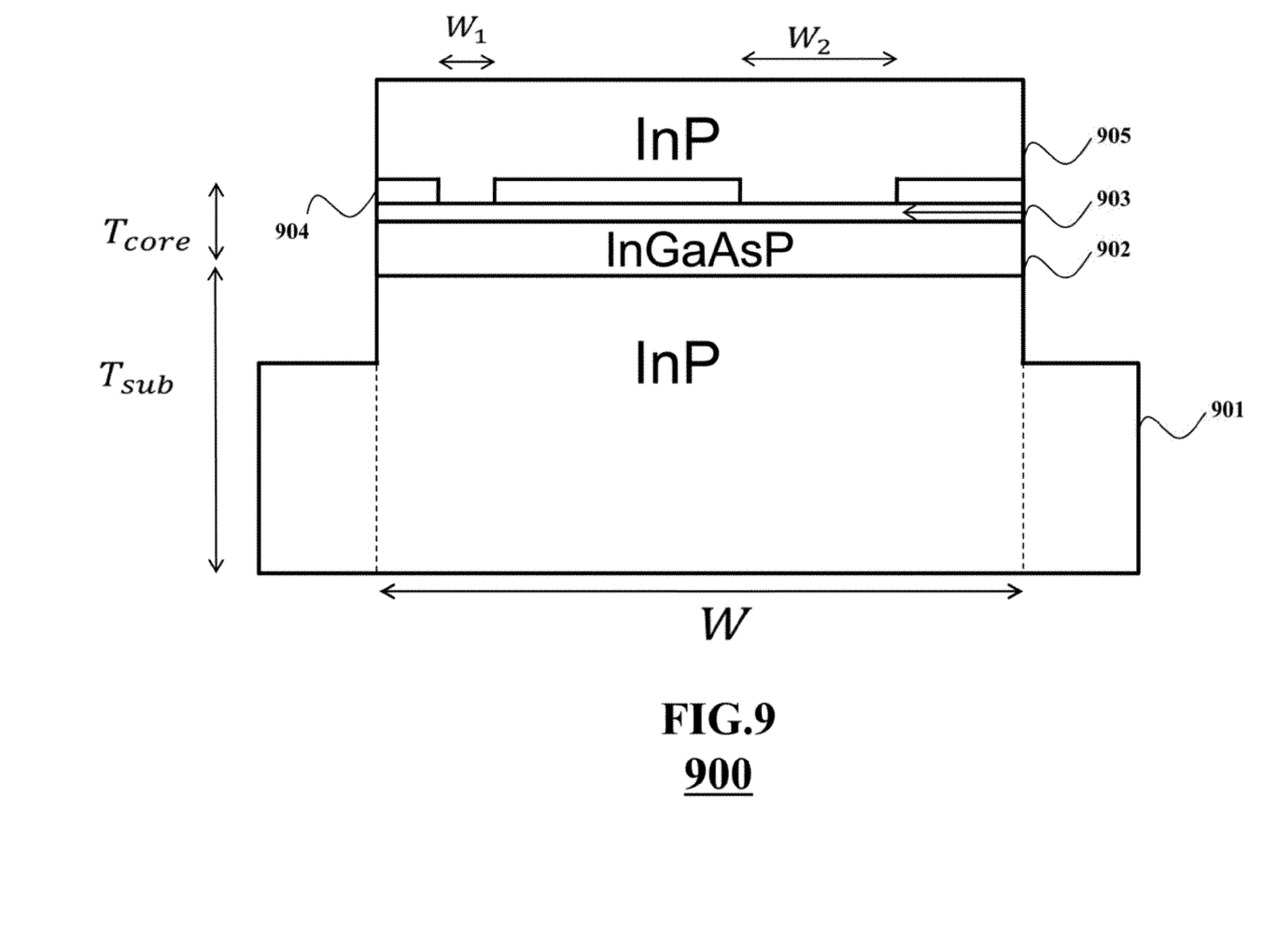
FIG. 9 is a cross section of MMI device fabricated according to yet another embodiment of the invention.

FIG. 9 shows the MMI device 900 fabricated according to yet another embodiment. This embodiment uses an etch-stop layer to minimize the fluctuation of etching of different patches. For example, etching rate for InGaAsP material depends on the composition (y) and the etching solution (in the case of wet etching) or the gas (in the case of dry etching). By selecting a specific composition, the InGaAsP layer can act as a etch-stop layer, having a slow etching rate for the material of the layer. In this case, regardless of etching condition variations, the stop-etching layer slows the etching and reduces variation of the etching depth.

The fabrication includes growing a first core layer 902 of the MMI device 900 on a substrate 901. Growing an etch-stop layer 903 of the MMI device on the first core layer. Growing a second core layer 904 of the MMI device on the etch-stop layer. Etching the second core layer according to the non-uniform pattern of patches to form a non-uniform pattern of etches. Growing a cladding layer 905 filling the non-uniform pattern of etches. The fabrication according to this embodiment minimizes the variation of the etching depth.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A multi-mode interference (MMI) device, comprising:
a substrate layer;
a core layer grown on the substrate layer for propagating an optical signal;
a cladding layer grown on the core layer for guiding the optical signal, wherein the MMI device includes a non-uniform pattern of patches forming a non-uniform refractive index distribution within the MMI device;
a core layer of the MMI device, wherein the core layer is etched according to the non-uniform pattern of patches to form a non-uniform pattern of etches; and
a cladding layer filling the non-uniform pattern of etches.

2. The MMI device of claim 1, wherein the MMI device manipulates the optical signal according to a predetermined task, and wherein the non-uniform pattern of patches is optimized for the predetermined task.

3. The MMI device of claim 2, wherein the optical signal includes multiple signals with different wavelength, wherein the predetermined task includes splitting the optical signal into the separate signals, such that the non-uniform pattern of patches is optimized for splitting signals of each wavelength.

4. The MMI device of claim 2, wherein the optical signal includes multiple signals with different wavelength, wherein the predetermined task includes combining the optical signals from separate ports into a single port, such that the non-uniform pattern of patches is optimized for combining signals of each wavelength.

5. The MMI device of claim 1, wherein each patch has a rectangular shape and is etched through the cladding layer into the core layer by a constant thickness, and wherein dimensions of at least two patches in the non-uniform pattern are different.

6. The MMI device of claim 1, wherein at least two patches in the non-uniform pattern overlap with each other.

7. The MMI device of claim 1, wherein a refractive index for a region of a patch is less than a refractive index for a non-patch region.

8. The MMI device of claim 1, wherein at least two patches in the non-uniform pattern varies in shape or material.

9. The MMI device of claim 1, wherein edges of at least one patch in the non-uniform pattern are slanted with respect to an input plane of the MMI.

10. A method for manipulating an optical signal according to a predetermined task by a multi-mode interference (MMI) device, comprising:
determining a non-uniform pattern of patches forming a non-uniform refractive index distribution within the MMI device, such that the non-uniform pattern of patches manipulates the optical signal according to the predetermined task; and
fabricating the MMI device having the non-uniform pattern of patches, wherein the fabricating comprises;
depositing a core layer of the MMI device;
etching the core layer according to the non-uniform pattern of patches to form a non-uniform pattern of etches; and
depositing a cladding layer filling the non-uniform pattern of etches.

11. The method of claim 10, wherein the determining comprises:
determining a random set of parameters of the non-uniform pattern of patches; and
optimizing a metric function of the parameters defining an operation of the MMI device performing the predetermined task to produce an optimal set of parameters; and
determining the non-uniform pattern of patches using the optimal set of parameters.

12. The method of claim 11, wherein the optimizing includes a covariance matrix adaptation evolutionary optimization.

13. The method of claim 11, wherein the random set of parameters for a patch includes a lateral width $W_p$ of the patch, an offset $O_p$ of the patch, a position $P_p$ of the patch and a length $L_p$ of the patch.

14. The method of claim 11, wherein the metric function includes a term maximizing a desired output.

15. The method of claim 11, wherein the metric function includes a term minimizing an undesirable output.

16. The method of claim 11, wherein the metric function Metric is $$\text{Metric} = \log [P_1^{\lambda_1}] + \log [P_2^{\lambda_2}] - \log [P_1^{\lambda_2}+1] - \log [P_2^{\lambda_1}+1],$$

wherein $P_m^{\lambda_n}$ is $m^{th}$ mode power at $m^{th}$ output of the MMI device at wavelength $\lambda_n$, n=1,2, m=1,2.

17. The method of claim 11, further comprising:
determining a number of patches in the non-uniform pattern of patches; and
determining the random set of parameters for each patch in the non-uniform pattern.

18. The method of claim 10, wherein the fabricating comprises:
growing a first core layer of the MMI device;
growing a first cladding layer of the MMI device grown on the first core layer;
growing a second core layer of the MMI device grown on the first cladding layer;
etching the second core layer according to the non-uniform pattern of patches to form a non-uniform pattern of etches; and
growing a second cladding layer filling the non-uniform pattern of etches.

19. The method of claim 10, wherein the fabricating comprises:
growing a first core layer of the MMI device;
growing an etch-stop layer of the MMI device;

growing a second core layer of the MMI device deposit on the etch-stop layer;

etching the second core layer according to the non-uniform pattern of patches to form a non-uniform pattern of etches, wherein an etching rate of the etch-stop layer is slower than the etching rate of the second core layer; and growing a cladding layer filling the non-uniform pattern of etches.

* * * * *